(12) United States Patent
Tsuji

(10) Patent No.: US 11,386,483 B2
(45) Date of Patent: Jul. 12, 2022

(54) SERVER, NON-TRANSITORY COMPUTER-READABLE RECORDING MEDIUM STORING COMPUTER-READABLE INSTRUCTIONS FOR SERVER, AND METHOD EXECUTED BY SERVER FOR SENDING NOTIFICATION FOR PROMPTING ORDER OF NEW CONSUMABLE ARTICLE FOR PRINTER

(71) Applicant: BROTHER KOGYO KABUSHIKI KAISHA, Nagoya (JP)

(72) Inventor: Kazuki Tsuji, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/089,882

(22) Filed: Nov. 5, 2020

(65) Prior Publication Data
US 2021/0142392 A1 May 13, 2021

(30) Foreign Application Priority Data
Nov. 8, 2019 (JP) .............................. JP2019-203345

(51) Int. Cl.
*G06Q 30/06* (2012.01)
*G06Q 10/08* (2012.01)
(Continued)

(52) U.S. Cl.
CPC ....... *G06Q 30/0635* (2013.01); *G06F 3/1203* (2013.01); *G06F 3/1229* (2013.01);
(Continued)

(58) Field of Classification Search
CPC ............ G06Q 30/0635; G06Q 10/083; G06Q 10/087; G06Q 10/107; G06F 16/9566;
(Continued)

(56) References Cited

U.S. PATENT DOCUMENTS 7,528,973 B2 * 5/2009 Enomoto ........... H04N 1/00244
358/1.14
8,482,756 B2 * 7/2013 Kai ....................... G06F 3/1284
358/1.9

(Continued)

FOREIGN PATENT DOCUMENTS

| JP | 2004-013750 A | 1/2004 |
| JP | 2016-194770 A | 11/2016 |
| JP | 2019-145034 A | 8/2019 |

*Primary Examiner* — Allen H Nguyen
(74) *Attorney, Agent, or Firm* — Scully, Scott, Murphy & Presser, PC

(57) ABSTRACT

A server may execute a first shipping process for shipping a first consumable article for a printer and store first identification information in a memory. The server may receive consumable article information from an external device, determine whether a notification condition is satisfied and determine whether the first identification information matches second identification information included in the consumable article information. In a case where it is determined that the notification condition is satisfied and the first identification information matches the second identification information, the server may send a first notification to external. In a case where it is determined that the notification condition is not satisfied, the first notification is not sent, and in a case where it is determined that the first identification information does not match the second identification information, the first notification is not sent.

16 Claims, 10 Drawing Sheets

(51) Int. Cl.
  *G06Q 10/10* (2012.01)
  *G06F 16/955* (2019.01)
  *G06F 3/12* (2006.01)

(52) U.S. Cl.
  CPC .......... *G06F 3/1293* (2013.01); *G06F 3/1296* (2013.01); *G06F 16/9566* (2019.01); *G06Q 10/083* (2013.01); *G06Q 10/087* (2013.01); *G06Q 10/107* (2013.01)

(58) Field of Classification Search
  CPC .... G06F 3/1203; G06F 3/1229; G06F 3/1293; G06F 3/1296
  USPC ........................................................ 358/1.15
  See application file for complete search history.

(56) References Cited

U.S. PATENT DOCUMENTS

| | | | |
|---|---|---|---|
| 2016/0288515 A1* | 10/2016 | Matsuda | G06K 15/4075 |
| 2016/0292629 A1 | 10/2016 | Matsuda | |
| 2016/0292774 A1* | 10/2016 | Ohara | G06F 3/1287 |
| 2017/0301006 A1 | 10/2017 | Matsuda | |
| 2018/0131831 A1* | 5/2018 | Tolia | H04N 1/00042 |
| 2018/0349835 A1* | 12/2018 | Ishida | G06Q 10/087 |
| 2019/0266564 A1 | 8/2019 | Banno | |
| 2020/0041944 A1* | 2/2020 | Hiraike | G06Q 10/087 |

* cited by examiner (Continuation of FIG. 3)

(Continuation of FIG. 7)

SERVER, NON-TRANSITORY COMPUTER-READABLE RECORDING MEDIUM STORING COMPUTER-READABLE INSTRUCTIONS FOR SERVER, AND METHOD EXECUTED BY SERVER FOR SENDING NOTIFICATION FOR PROMPTING ORDER OF NEW CONSUMABLE ARTICLE FOR PRINTER

CROSS-REFERENCE TO RELATED APPLICATION

This application claims priority to Japanese Patent Application No. 2019-203345, filed on Nov. 8, 2019, the entire contents of which are hereby incorporated by reference into the present application.

TECHNICAL FIELD

The art disclosed herein relates to a server configured to externally send a notification for prompting an order of a new consumable article for a printer.

BACKGROUND ART

An order assisting system for consumable articles, which is provided with a printer, a user terminal, a server, an inventory management terminal, and a distribution center terminal, is known. When a remaining amount of a consumable article in the printer becomes small, the printer sends information indicating that the remaining amount of the consumable article has become small to the server through the user terminal. When receiving this information from the user terminal, the server sends information including a device name of the printer and the like to the inventory management terminal. When receiving this information from the server, the inventory management terminal updates a consumable article stock quantity stored in the inventory management terminal. Then, the inventory management terminal sends a warning e-mail to the user terminal when the consumable article stock quantity becomes equal to or less than a warning stock quantity. As such, the user can access an order website notified in the warning e-mail to order a consumable article.

SUMMARY

It may be expected that after the user ordered a first consumable article by accessing the order website, the user purchases a second consumable article in a store and attaches the second consumable article to the printer. In this case, the user comes to possess the first consumable article as an excess consumable article. In such a situation, if the warning e-mail is sent to the user terminal due to the second consumable article being consumed, another consumable article may be ordered. In this case, another excess consumable article is delivered to the user, although the user can attach the first consumable article to the printer.

The disclosure herein discloses art that suppresses possession of an excess consumable article by a user.

A server disclosed herein may comprise: a controller configured to: execute a first shipping process for shipping a first consumable article for a printer in response to accepting a first order instruction from a user, the first consumable article being identified by first identification information; in a case where the first shipping process is executed, store the first identification information in a memory; receive consumable article information including usage information from an external device in a state where the first identification information is stored in the memory, the usage information being information related to a current used amount of a second consumable article that is currently attached to the printer; in a case where the consumable article information is received from the external device, determine by using the usage information included in the consumable article information whether a notification condition is satisfied, the notification condition being related to an order of a new consumable article; in a case where the consumable article information is received from the external device and the consumable article information includes second identification information for identifying the second consumable article, determine whether the first identification information in the memory matches the second identification information included in the consumable article information; and in a case where it is determined that the notification condition is satisfied and the first identification information matches the second identification information, send a first notification for prompting the user to order a new consumable article to external, wherein in a case where it is determined that the notification condition is not satisfied, the first notification is not sent, and in a case where it is determined that the first identification information does not match the second identification information, the first notification is not sent.

A control method, a computer program, and a computer-readable recording medium storing the computer program for realizing the aforementioned server are also novel and useful. Further, a communication system that comprises the aforementioned server and external device is also novel and useful.

BRIEF DESCRIPTION OF THE DRAWINGS

EMBODIMENTS (Configuration of Communication System 2; FIG. 1)
As shown in FIG. 1, a communication system 2 includes a printer 10, a terminal device 100, a management server 200, and a shipping server 300. The printer 10 and the terminal device 100 are connected to a first Local Area Network (LAN) 4. The first LAN 4 is not connected to the Internet 8. The printer 10 and the terminal device 100 are capable of communicating with each other through the first LAN 4. The terminal device 100 is connected to a second LAN 6. The second LAN 6 is connected to the Internet 8. The management server 200 and the shipping server 300 are connected to the Internet 8. The management server 200 and the shipping server 300 are servers configured to provide a shipping service of shipping cartridges to a user of the printer 10.

(Configuration of Printer 10)

Figure 1:
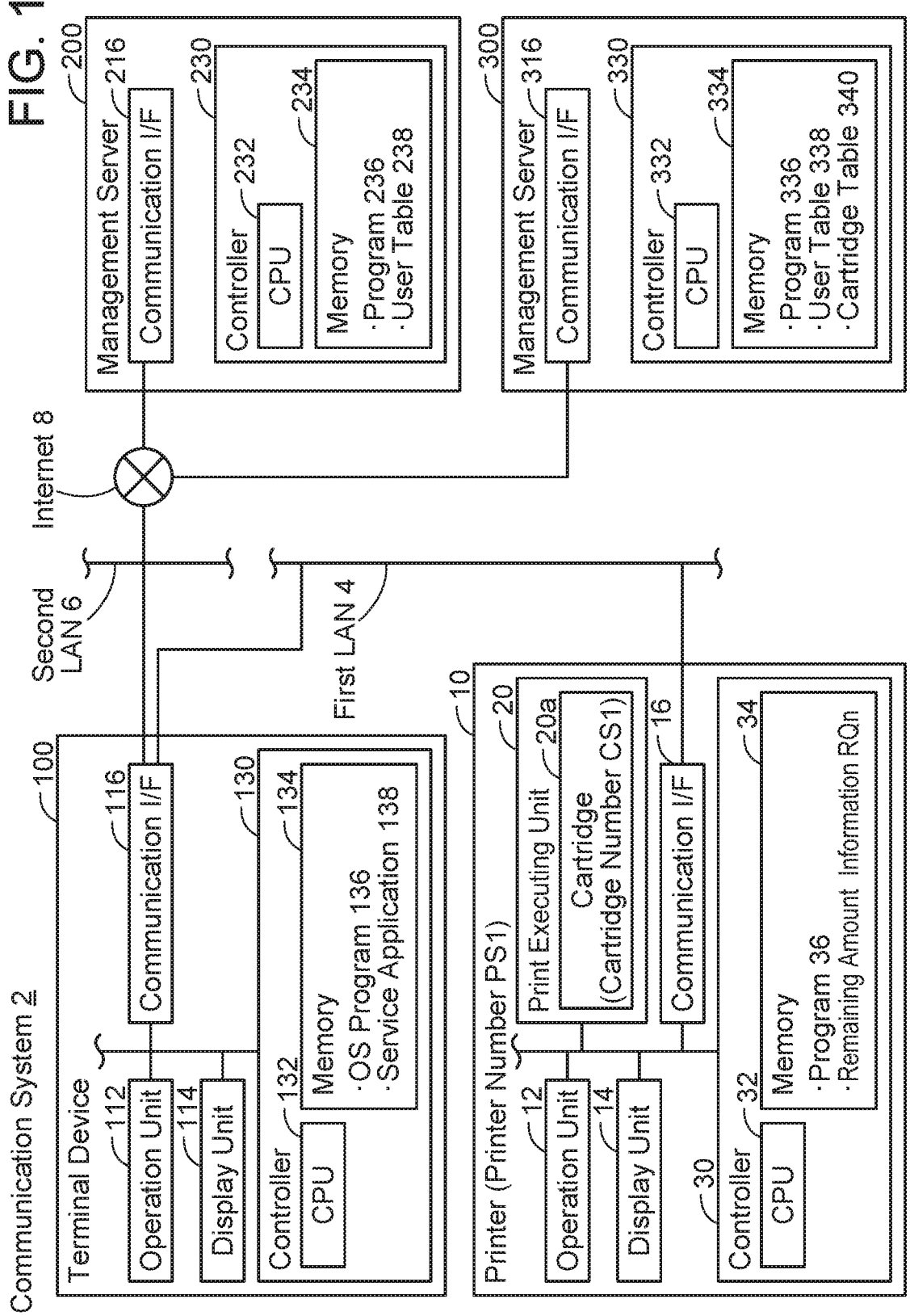
FIG. 1 shows a configuration of a communication system.

The printer 10 is a peripheral device (e.g., a peripheral device of a PC, etc.) configured to execute a print function. The printer 10 may be a printer configured to execute printing on paper or may be a printer configured to execute printing on clothing. Further, the printer 10 may be a multi-function peripheral configured to execute a scan function, a FAX function, and/or the like in addition to the print function. The printer 10 includes an operation unit 12, a display unit 14, a communication interface (hereinbelow, an interface will be denoted "I/F") 16, a print executing unit 20, and a controller 30. A printer number PS1 is assigned to the printer 10. Printer numbers are unique character strings assigned, when a plurality of printers is manufactured, to the printers respectively.

The operation unit 12 includes a plurality of keys. The user can input various instructions to the printer 10 by operating the operation unit 12. The display unit 14 is a display for displaying various types of information. The communication I/F 16 is connected to the first LAN 4. The communication I/F 16 is not connected to the Internet 8. The communication I/F 16 may be a wireless I/F or a wired I/F.

The print executing unit 20 is an inkjet print mechanism A cartridge 20a storing ink therein is attached to the print executing unit 20. The print executing unit 20 is configured to execute printing by using the ink in the cartridge 20a. A cartridge number CS1 is assigned to the cartridge 20a. Cartridge numbers are unique character strings assigned, when a plurality of cartridges is manufactured, to the cartridges respectively.

The controller 30 includes a CPU 32 and a memory 34. The CPU 32 is configured to execute various processes in accordance with a program 36 stored in the memory 34. The memory 34 is constituted of a volatile memory, a non-volatile memory, and the like. The memory 34 stores remaining amount information RQn. The remaining amount information RQn indicates a current remaining amount in the cartridge 20a attached to the print executing unit 20. When the print function is executed, the CPU 32 calculates a used amount of the ink in the cartridge 20a and subtracts the calculated used amount from the remaining amount information RQn to update the remaining amount information RQn. Further, when a new cartridge is attached to the print executing unit 20, the CPU 32 updates the remaining amount information RQn to "100".

(Configuration of Terminal Device 100)

The terminal device 100 is a portable device such as a cellphone, a smartphone, a PDA, a portable music player, or a portable video player. The terminal device 100 includes an operation unit 112, a display unit 114, a communication I/F 116, and a controller 130.

The operation unit 112 includes a plurality of keys. The user can input various instructions to the terminal device 100 by operating the operation unit 112. The display unit 114 is a display for displaying various types of information. The display unit 114 functions also as a so-called touch panel (i.e., an operation unit). The communication I/F 116 is connected to the first LAN 4 and the second LAN 6. The communication I/F 116 is connected to the Internet 8 via the second LAN 6.

The controller 130 includes a CPU 132 and a memory 134. The CPU 132 is configured to execute various processes in accordance with an Operating System (OS) program 136 stored in the memory 134. The OS program 136 is a program for controlling basic operations of the terminal device 100. Further, the memory 134 stores a service application 138. The service application 138 is an application used to receive the shipping service provided by the management server 200 and the shipping server 300. The service application 138 is installed, for example, from a server on the Internet 8 to the terminal device 100.

(Configuration of Management Server 200)

The management server 200 is provided on the Internet 8 by a vendor of the printer 10. In a variant, the management server 200 may be provided on the Internet 8 by a business entity different from the vendor.

The management server 200 includes a communication I/F 216 and a controller 230. The communication I/F 216 is connected to the Internet 8. The controller 230 includes a CPU 232 and a memory 234. The CPU 232 is configured to execute various processes in accordance with a program 236 stored in the memory 234. The memory 234 is constituted of a volatile memory, a non-volatile memory, and the like. The memory 234 further stores a user table 238.

(Configuration of Shipping Server 300)

The shipping server 300 is provided on the Internet 8 by the vendor of the printer 10. In a variant, the shipping server 300 may be provided on the Internet 8 by a business entity different from the vendor.

The shipping server 300 includes a communication I/F 316 and a controller 330. The communication I/F 316 is connected to the Internet 8. The controller 330 includes a CPU 332 and a memory 334. The CPU 332 is configured to execute various processes in accordance with a program 336 stored in the memory 334. The memory 334 is constituted of a volatile memory, a non-volatile memory, and the like. The memory 334 further stores a user table 338 and a cartridge table 340.

Figure 2:
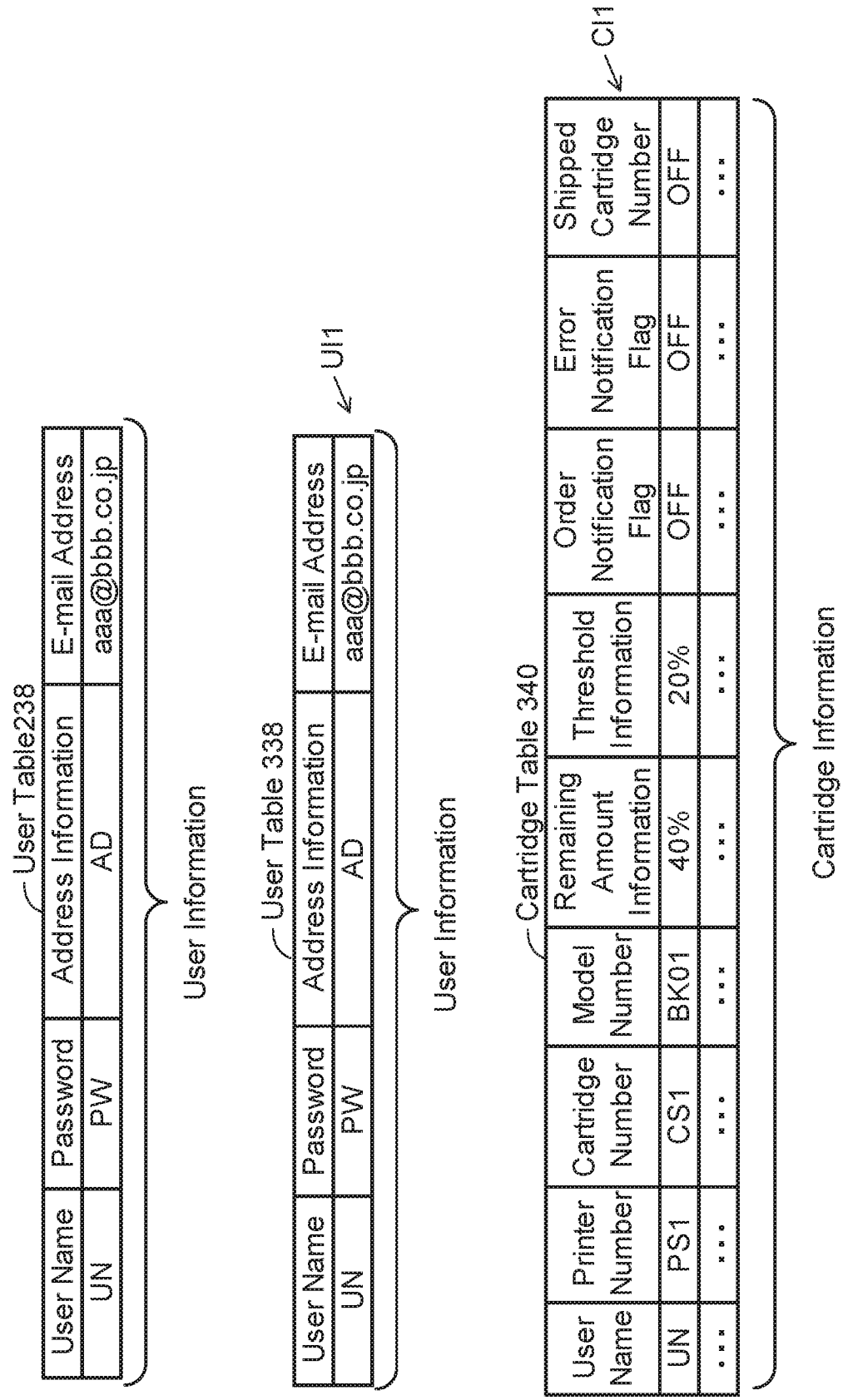
FIG. 2 shows tables.

(Configurations of Respective Tables; FIG. 2)

Next, contents of the table 238 in the management server 200 and the tables 338 and 340 in the shipping server 300 will be described with reference to FIG. 2.

The user table 238 in the management server 200 stores one or more pieces of user information. Each piece of user information includes a user name (e.g., UN) for identifying a user, a password (e.g., PW), address information (e.g., AD) indicating an address of the user, and an e-mail address (e.g., "aaa@bbb.co.jp") of the user.

The user table 338 in the shipping server 300 stores the same user information as the user table 238 in the management server 200.

The cartridge table 340 stores one or more pieces of cartridge information. Each piece of cartridge information includes a user name (e.g., UN), a printer number (e.g., PS1), a cartridge number (e.g., CS1), a model number (e.g., "BK01") of the cartridge identified by the cartridge number, remaining amount information indicating the remaining amount of the cartridge, threshold information, an order notification flag, an error notification flag, and a shipped cartridge number. The threshold information is information for determining whether to send or not a first order notification that is a notification for prompting an order of a new cartridge. The order notification flag indicates one of "ON" that indicates the first order notification has been sent and "OFF" that indicates the first order notification has not been sent yet. The error notification flag indicates one of "ON" that indicates an error notification, which indicates that the cartridge currently attached to the printer is a product not covered by the shipping service, has been sent and "OFF" that indicates the error notification has not been sent yet. The shipped cartridge number indicates a cartridge number of cartridge that is shipped to the user when a new consumable article is ordered in response to an order notification having been sent.

Figure 3:
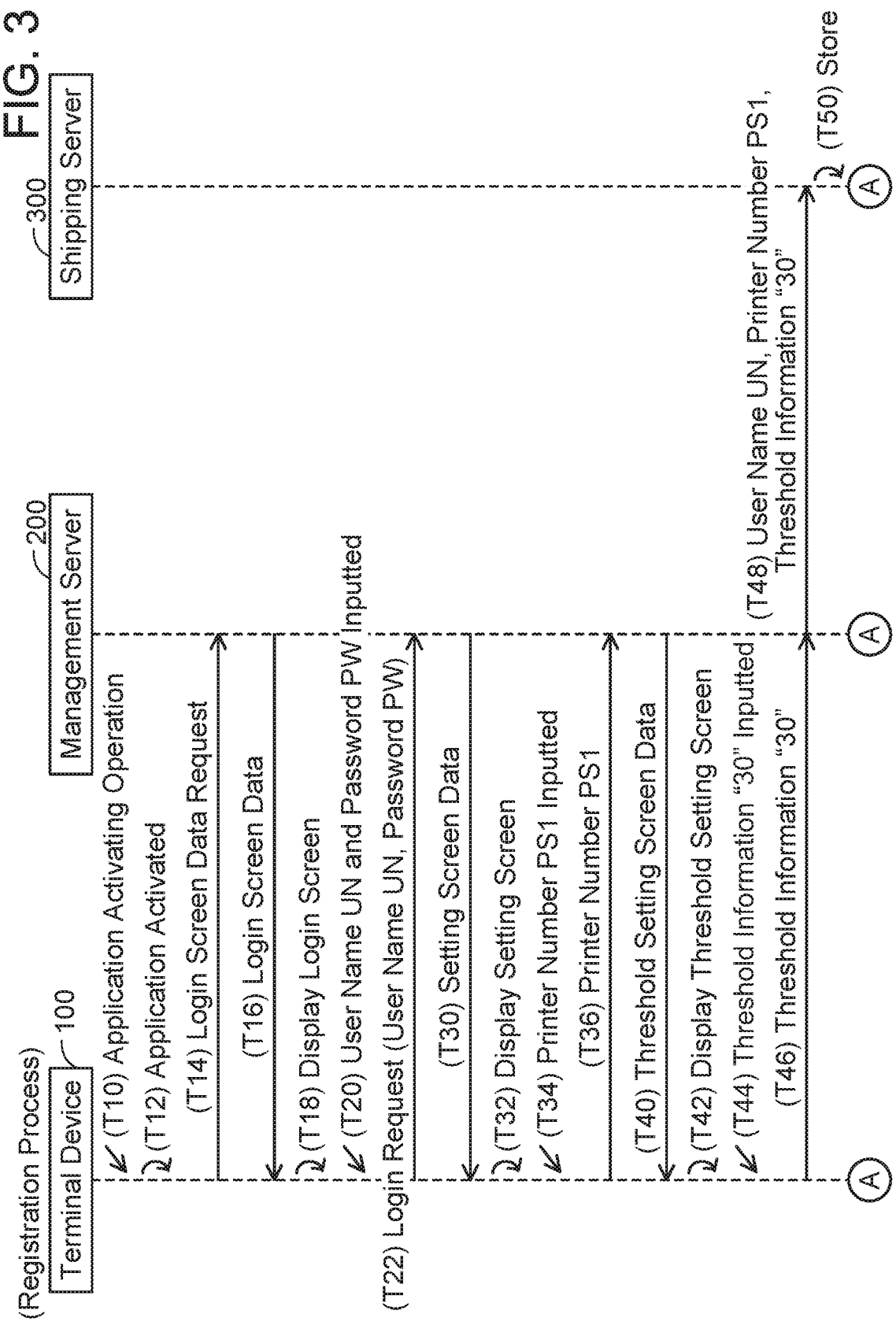
FIG. 3 shows a sequence diagram of a registration process.
Figure 4:
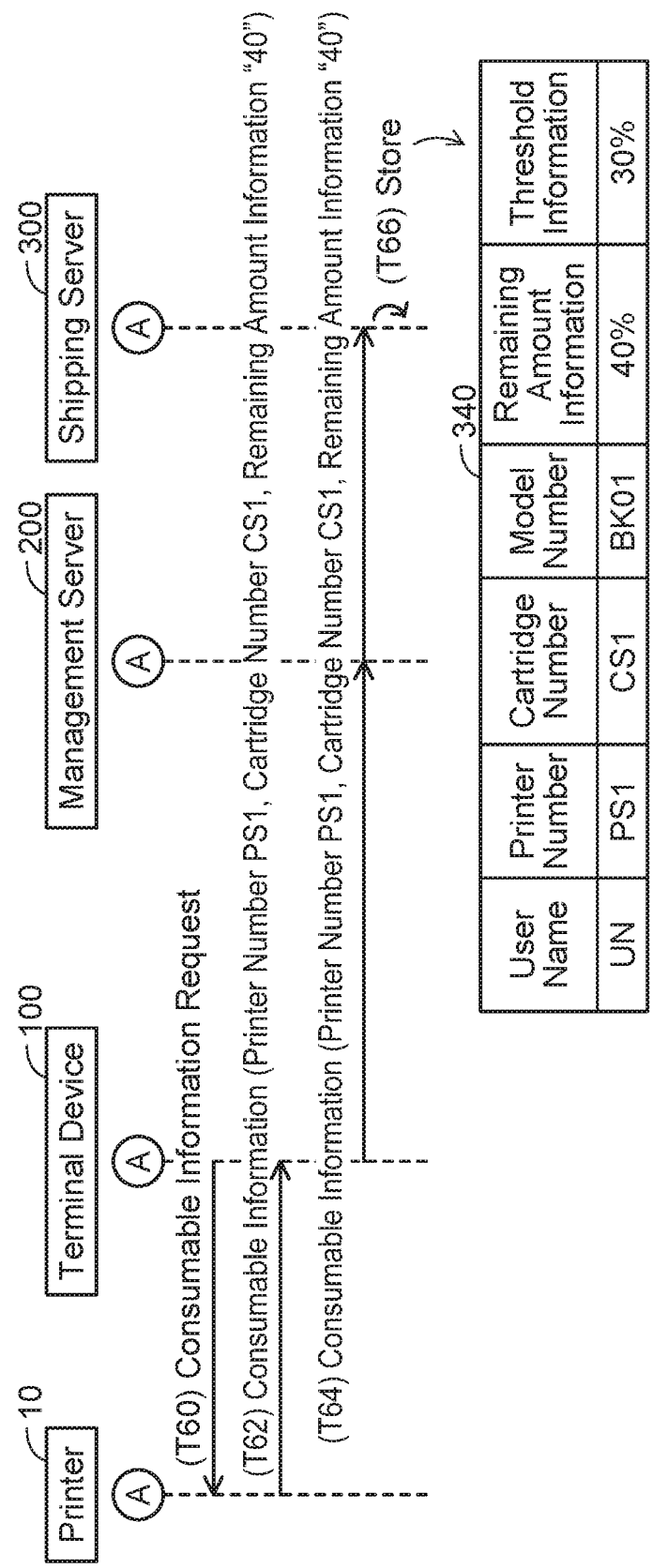
FIG. 4 shows continuation of FIG. 3.

(Registration Process; FIGS. 3 and 4)

Next, a registration process will be described with reference to FIGS. 3 and 4. The registration process is a process executed to enable the user of the printer 10 to receive the shipping service. Specifically, the registration process is a process of registering cartridge information in the cartridge table 340 of the shipping server 300. Hereinbelow, in order to facilitate understanding, processes executed by the CPUs of the respective devices (such as the CPU 32 of the printer 10) may be described with the respective devices (such as the printer 10) as the subject of action, instead of describing the CPUs as the subject of action. Further, every communication described below between the printer 10, the terminal device 100, the management server 200, and the shipping server 300 is executed via the communication I/F 16 of the printer 10, the communication I/F 116 of the terminal device 100, the communication I/F 216 of the management server 200, and the communication I/F 316 of the shipping server 300. As such, hereinbelow, a phrase "via the communication I/F 16 (116, 216, or 316)" will be omitted.

In an initial state of FIG. 3, the user table 238 of the management server 200 and the user table 338 of the shipping server 300 have already stored user information UI1 that includes a user name UN, a password PW, address information AD, and an e-mail address "aaa@bbb.co.jp". This user information is stored in the management server 200 and the shipping server 300 by the user using the terminal device 100, for example. Further, in the initial state of FIG. 3, the service application 138 has already been installed in the terminal device 100.

When accepting an operation for activating the service application 138 from the user in T10, the terminal device 100 activates the service application 138 in T12 and sends a login screen data request to the management server 200 in T14.

When receiving the login screen data request from the terminal device 100 in T14, the management server 200 sends login screen data to the terminal device 100 in T16.

When receiving the login screen data from the management server 200 in T16, the terminal device 100 displays a login screen on the display unit 114 in T18. Then, when accepting an operation of inputting the user name UN and the password PW from the user in T20, the terminal device 100 sends a login request including the user name UN and the password PW to the management server 200 in T22.

When receiving the login request from the terminal device 100 in T22, the management server 200 determines that authentication is successful because the combination of the user name UN and the password PW included in the login request is in the user table 238. In this case, the management server 200 sends setting screen data to the terminal device 100 in T30.

When receiving the setting screen data from the management server 200 in T30, the terminal device 100 displays a setting screen on the display unit 114 in T32. The setting screen is a screen for inputting the printer number of a printer that is a target of the shipping service. When accepting an operation of inputting the printer number PS1 from the user in T34, the terminal device 100 sends the printer number PS1 to the management server 200 in T36.

When receiving the printer number PS1 from the terminal device 100 in T36, the management server 200 sends threshold setting screen data to the terminal device 100 in T40.

When receiving the threshold setting screen data from the management server 200 in T40, the terminal device 100 displays a threshold setting screen on the display unit 114 in T42. The threshold setting screen is a screen for allowing the user to input threshold information. When accepting an operation of inputting threshold information "30" from the user in T44, the terminal device 100 sends the threshold information "30" to the management server 200 in T46.

When receiving the threshold information "30" from the terminal device 100 in T46, the management server 200 identifies the logged in user name UN, and sends to the shipping server 300 in T48 the identified user name UN, the printer number PS1 received in T36, and the threshold information "30" received in T46.

When receiving the user name UN, the printer number PS1, and the threshold information "30" from the management server 200 in T48, the shipping server 300 associates the user name UN, the printer number PS1, and the threshold information "30" with each other and stores the same in the cartridge table 340 in T50.

In T60 of FIG. 4, the terminal device 100 sends a consumable article information request to the printer 10 to which the printer number PS1 inputted in T34 is assigned. The consumable article information request is a command for requesting a printer that received the request to send consumable article information that includes its printer number, the cartridge number of a cartridge currently attached to the printer, and the remaining amount information of the cartridge.

When receiving the consumable article information request from the terminal device 100 in T60, the printer 10 identifies the cartridge number CS1 of the cartridge 20a currently attached to the printer 10 and the remaining amount information RQn in the memory 34. Then, in T62, the printer 10 sends to the terminal device 100 consumable article information including the printer number PS1, the cartridge number CS1, and the remaining amount information "40".

When receiving the consumable article information from the printer 10 in T62, the terminal device 100 sends the consumable article information to the shipping server 300 via the management server 200 in T64. As aforementioned, the communication I/F 16 of the printer 10 is not connected to the Internet 8. That is, the printer 10 cannot send the consumable article information to the management server 200 via the Internet 8. In the present embodiment, the terminal device 100 receives the consumable article information from the printer 10 and sends this consumable article information to the management server 200. As such, the management server 200 can receive the consumable article information even though the printer 10 cannot access the Internet 8. As a result, the user of the printer 10 can receive the shipping service provided by the management server 200 and the shipping server 300.

When receiving the consumable article information from the management server 200 in T64, the shipping server 300 identifies the printer number PS1 in the consumable article information. Then, in T66, the shipping server 300 stores, in the cartridge table 340, the cartridge number CS1 in the consumable article information, a model number "BK01" of the cartridge that can be attached to the printer 10 identified by the cartridge number CS1, and the remaining amount information "40" in the consumable article information in association with the printer number PS1 in the cartridge table 340 (see T50 of FIG. 5). At this time, the order notification flag and the error notification flag associated with the printer number PS1 in the cartridge table 340 are all set in "OFF". Further, the shipped cartridge number is empty. As a result, cartridge information CH (see FIG. 2) is registered in the cartridge table 340. After this, the terminal device 100 sends the consumable article information request to the printer 10 every predetermined time (e.g., every 12 hours) and sends the consumable article information received from the printer 10 to the shipping server 300 via the management server 200.

Figure 5:
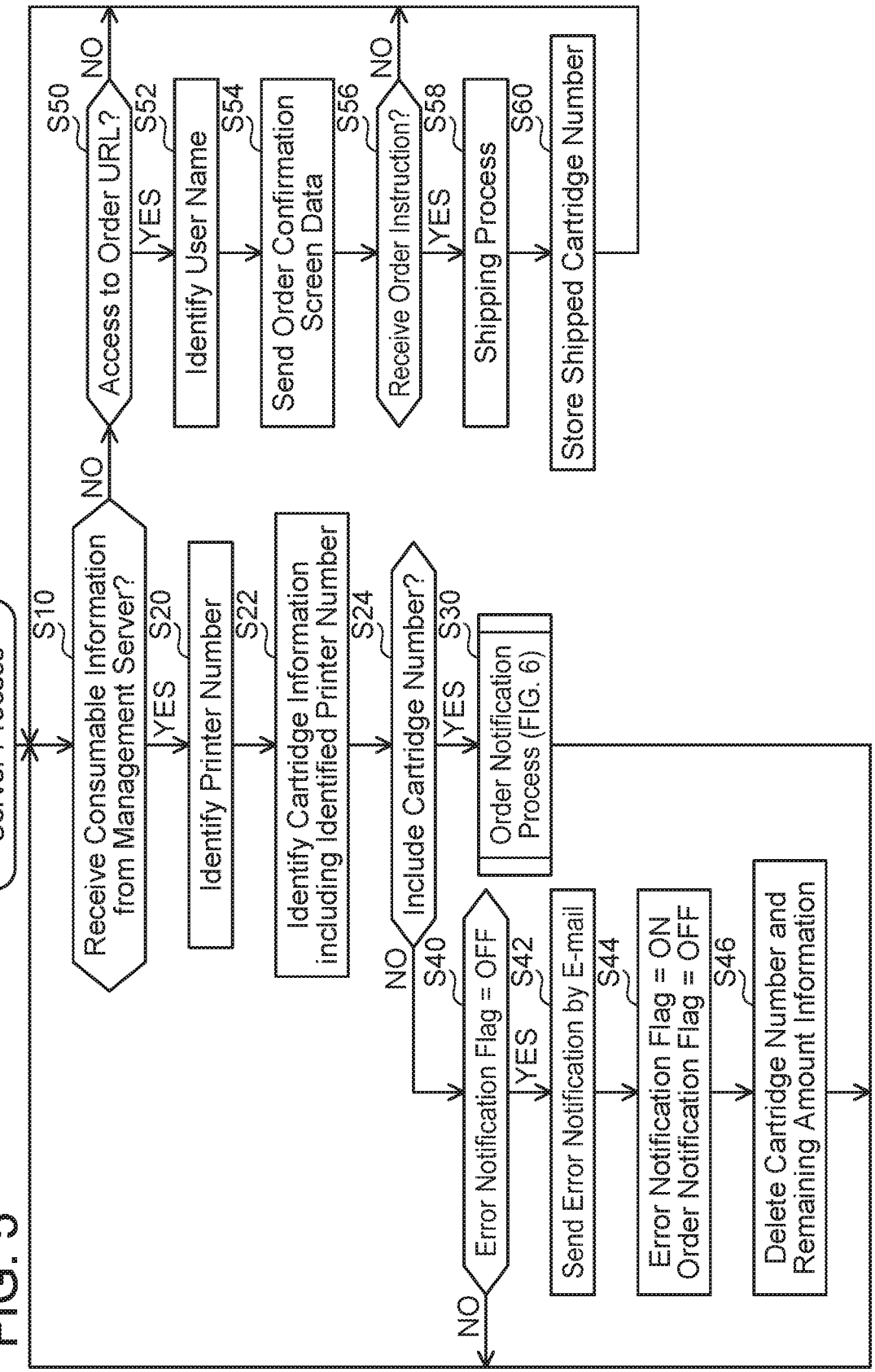
FIG. 5 shows a flowchart of a server process executed by a server.

(Server Process; FIG. 5)

Next, contents of a server process executed by the CPU 332 of the shipping server 300 will be described with reference to FIG. 5. The server process is executed after the registration process of FIGS. 3 and 4 is completed, that is, after one or more pieces of cartridge information have been registered in the cartridge table 340.

In S10, the CPU 332 monitors whether consumable article information has been received from the management server 200. In a case where consumable article information has been received from the management server 200, the CPU 332 determines YES in S10 and proceeds to S20.

In S20, the CPU 332 identifies the printer number included in the consumable article information received in S10.

In S22, the CPU 332 identifies cartridge information including the printer number identified in S20 (hereinbelow termed "target cartridge information") in the cartridge table 340.

In S24, the CPU 332 determines whether the consumable article information received in S10 includes a cartridge number. The CPU 332 proceeds to S30 in a case of determining that the received consumable article information includes a cartridge number (YES in S24). On the other hand, the CPU 332 proceeds to S40 in a case of determining that the received consumable article information does not include a cartridge number (NO in S24). The case in which the consumable article information does not include a cartridge number may be a case in which the cartridge currently attached to the printer 10 is not covered by the shipping service and the printer 10 cannot obtain the cartridge number of this cartridge.

Figure 6:
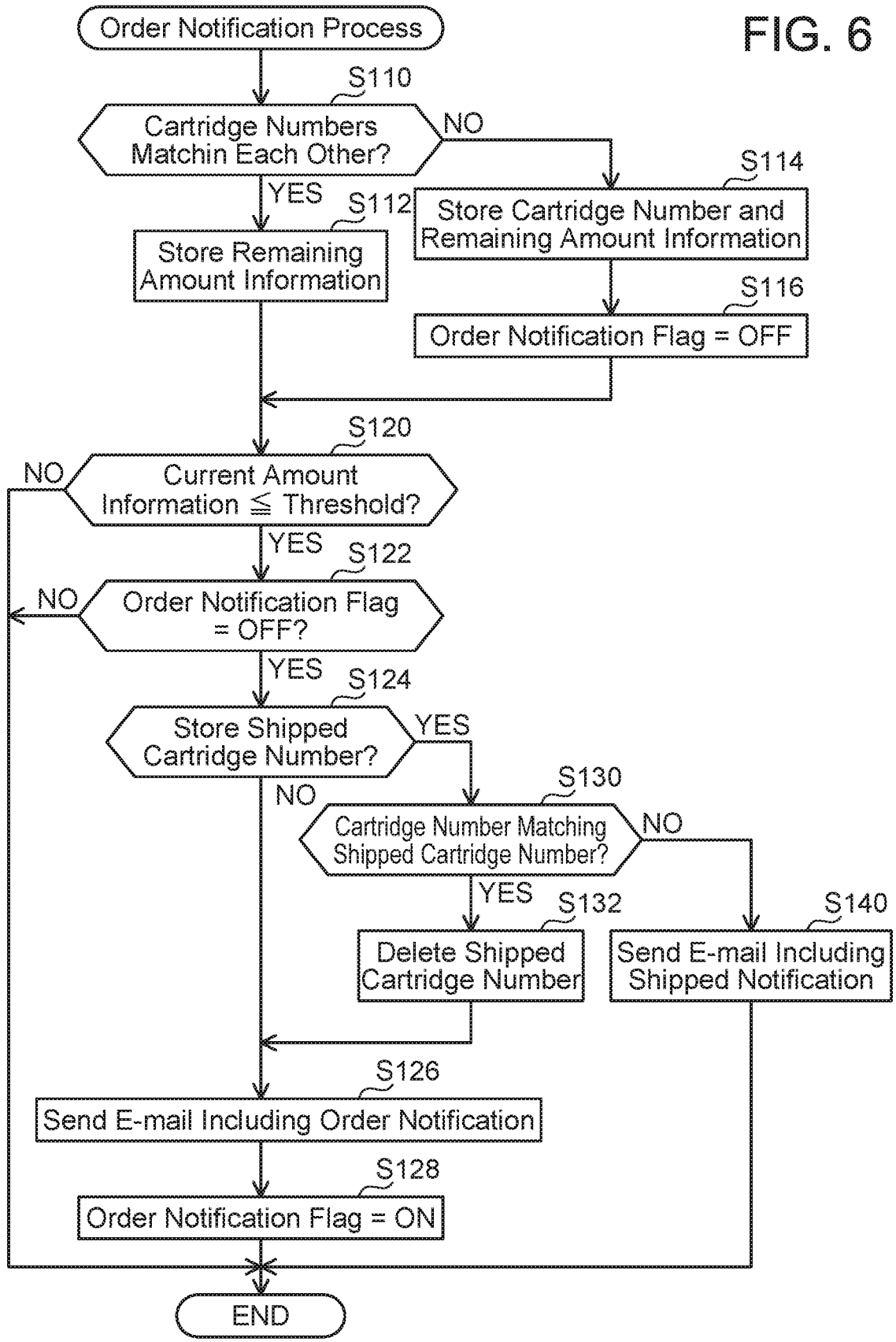
FIG. 6 shows a flowchart of an order notification process executed by the server.

In S30, the CPU 332 executes an order notification process (see FIG. 6). The order notification process is a process of sending an order notification by e-mail. When S30 is completed, the CPU 332 returns to S10.

In S40, the CPU 332 determines whether the error notification flag in the target cartridge information is "OFF" or not. The CPU 332 proceeds to S42 in a case of determining that the error notification flag is "OFF" (YES in S40). On the other hand, the CPU 332 returns to S10 in a case of determining that the error notification flag is "ON" (NO in S40).

In S42, the CPU 332 sends an e-mail including the error notification to the terminal device 100. Specifically, the CPU 332 firstly identifies the user name in the target cartridge information and identifies the e-mail address associated with the identified user name in the user table 338. Then, the CPU 332 sends an e-mail including the error notification to the identified e-mail address. As such, the e-mail is sent to the terminal device 100, which is capable of receiving e-mails addressed to the identified e-mail address. The error notification includes a message indicating that the cartridge currently attached to the printer is not covered by the shipping service. As such, the user of the printer 10 can acknowledge that the shipping service is not available currently.

In S44, the CPU 332 changes the error notification flag from "OFF" to "ON" in the case where the error notification flag in the target cartridge information is "OFF" and changes the order notification flag from "ON" to "OFF" in a case where the order notification flag in the target cartridge information is "ON".

In S46, the CPU 332 deletes the cartridge number and the remaining amount information in the target cartridge information. When S46 is completed, the CPU 332 returns to S10.

Figure 7:
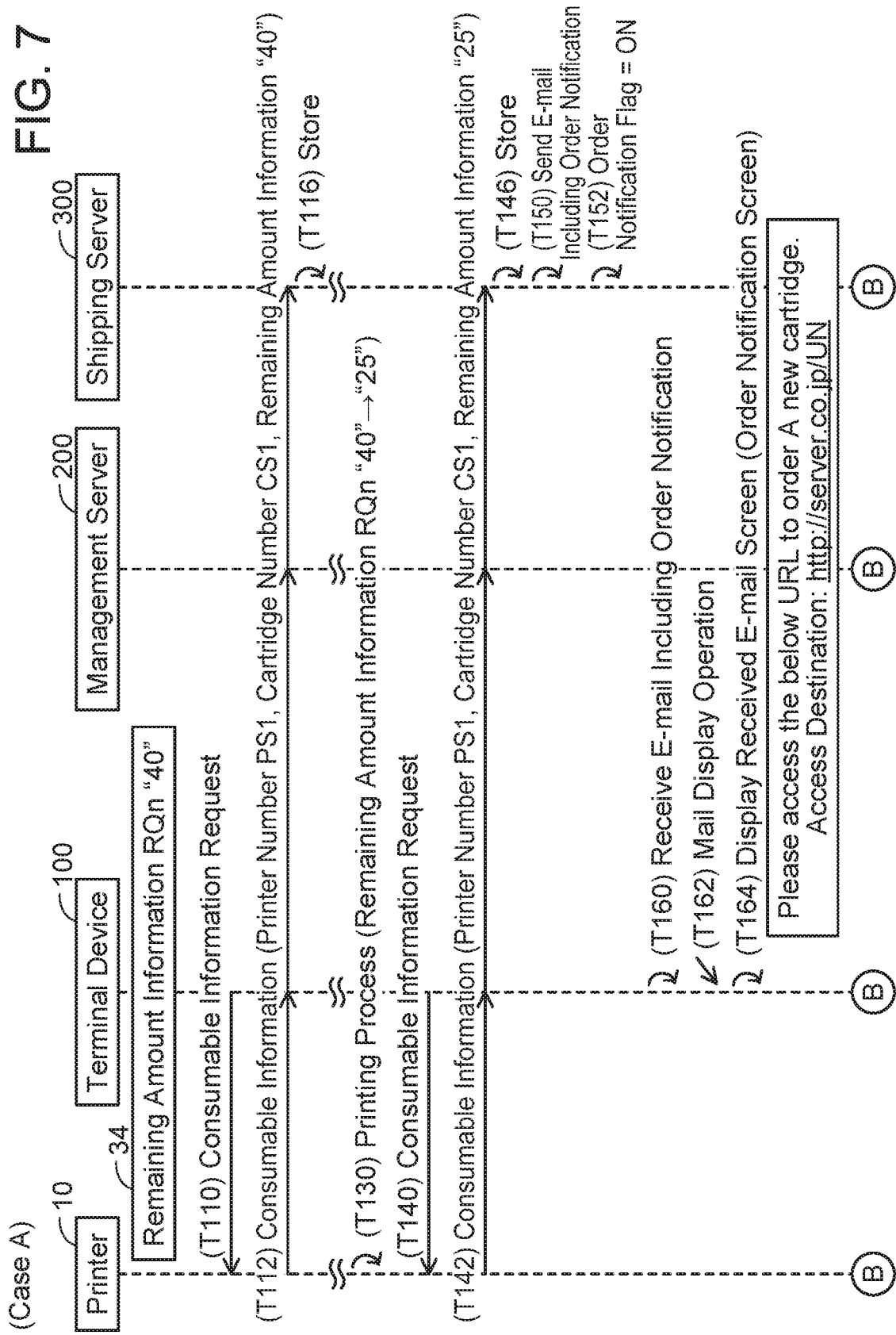
FIG. 7 shows a sequence diagram of Case A in which a shipped cartridge is attached to a printer.

Simultaneously with the monitoring of S10, the CPU 332 determines in S50 whether an order URL has been accessed. The order URL is a URL that is described in the order notification and is to be accessed to order a new cartridge. As shown in FIG. 7, the order URL includes a character string (a user name in the present embodiment) for identifying a user who accessed the order URL. The CPU 332 determines YES in S50 in a case where the order URL has been accessed and proceeds to S52.

In S52, the CPU 332 identifies the user name included in the order URL.

In S54, the CPU 332 sends order confirmation screen data to the terminal device 100. The order confirmation screen data is data for causing the terminal device 100 to display an order confirmation screen that is for confirming with the user whether a shipping process for shipping a new cartridge should be executed or not.

In S56, the CPU 332 determines whether an order instruction has been received from the terminal device 100. The CPU 332 proceeds to S58 in a case of determining that an order instruction has been received from the terminal device 100 (YES in S56). On the other hand, the CPU 332 returns to S10 in a case of determining that an order instruction has not been received from the terminal device 100 (NO in S56). The order instruction is a command for causing the shipping server 300 to receive an order and execute the shipping process.

In S58, the CPU 332 executes the shipping process. In the shipping process, the shipping server 300 firstly identifies the user information including the user name identified in S52 in the user table 338. Then, the shipping server 300 identifies the address information in the identified user information and executes a process for shipping a new cartridge to the address indicated by the identified address information. As above, the CPU 332 executes the shipping process in a case where the order URL has been accessed and the order instruction is received from the terminal device 100.

In S60, the CPU 332 identifies the cartridge information including the user name identified in S52 in the cartridge table 340 and stores the cartridge number assigned to the cartridge shipped in S58 as the shipped cartridge number of the identified cartridge information. The CPU 332 returns to S10 when S60 is completed. According to the above configuration, the CPU 332 executes the shipping process (S58) in the case where the order URL has been accessed and the order instruction is received from the terminal device 100. Thus, the CPU 332 executes the shipping process only when the user is wanting a new cartridge. Therefore, shipping of a new cartridge can be suppressed when, for example, the user has purchased a cartridge in a store and thus does not want a new cartridge.

(Order Notification Process: FIG. 6)

Next, the order notification process executed in S30 of FIG. 5 will be described with reference to FIG. 6. In S110, the CPU 332 determines whether the cartridge number in the consumable article information received in S10 of FIG. 5 matches the cartridge number in the target cartridge information. The CPU 332 proceeds to S112 in a case of determining that the cartridge number in the consumable article information matches the cartridge number in the target cartridge information (YES in S110). On the other hand, the CPU 332 proceeds to S114 in a case of determining that the cartridge number in the consumable article information does not match the cartridge number in the target cartridge information (NO in S110).

In S112, the CPU 332 stores the remaining amount information in the consumable article information received in S10 as the remaining amount information of the target cartridge information.

In S114, the CPU 332 stores the cartridge number and the remaining amount information in the consumable article information received in S10 as the cartridge number and the remaining amount information of the target cartridge information.

In S116, the CPU 332 changes the order notification flag in the target cartridge information from "ON" to "OFF".

In S120, the CPU 332 determines whether the remaining amount indicated by the remaining amount information in the consumable article information received in S10 is no greater than a threshold indicated by the threshold information in the target cartridge information. The CPU 332 proceeds to S122 in a case of determining that the remaining amount is equal to or less than the threshold (YES in S120). On the other hand, the CPU 332 terminates the process of FIG. 6 in a case of determining that the remaining amount is greater than the threshold (NO in S120).

In S122, the CPU 332 determines whether the order notification flag in the target cartridge information is "OFF" or not. The CPU 332 proceeds to S124 in a case of determining that the order notification flag is "OFF" (YES in S122). On the other hand, the CPU 332 terminates the process of FIG. 6 in a case of determining that the order notification flag is "ON" (NO in S122).

In S124, the CPU 332 determines whether a cartridge number has been stored as the shipped cartridge number in the target cartridge information. The CPU 332 proceeds to S126 in a case of determining that the shipped cartridge number in the target cartridge information is empty (NO in S124). On the other hand, the CPU 332 proceeds to S130 in a case of determining that a cartridge number has been stored as the shipped cartridge number in the target cartridge information (YES in S124).

In S126, similar to S42 of FIG. 5, the CPU 332 uses the target cartridge information and the user table 338 to identify the e-mail address to which an e-mail is to be sent and sends an e-mail including the order notification to the identified e-mail address.

In S128, the CPU 332 changes the order notification flag in the target cartridge information from "OFF" to "ON".

The CPU 332 proceeds to S130 in the case of determining NO in S124. In S130, the CPU 332 determines whether the cartridge number in the consumable article information received in S10 matches the shipped cartridge number in the target cartridge information. The CPU 332 proceeds to S132 in a case of determining that the cartridge number in the consumable article information matches the shipped cartridge number (YES in S130). On the other hand, the CPU 332 proceeds to S140 in a case of determining that the cartridge number in the consumable article information does not match the shipped cartridge number (NO in S130).

In S132, the CPU 332 deletes the shipped cartridge number in the target cartridge information. When S132 is completed, the CPU 332 proceeds to S126.

In S140, similar to S42 of FIG. 5, the CPU 332 uses the target cartridge information and the user table 338 to identify the e-mail address to which an e-mail is to be sent and sends an e-mail including a shipped notification to the identified e-mail address. The shipped notification includes a message indicating that the new cartridge that was shipped to the user of the printer 10 has not been used yet. Thus, the user can acknowledge that it is not necessary to order another new cartridge.

(Specific Cases; FIGS. 7 to 10)

Next, specific cases realized by the processes of FIGS. 5 and 6 will be described with reference to FIGS. 7 to 10.

Figure 8:
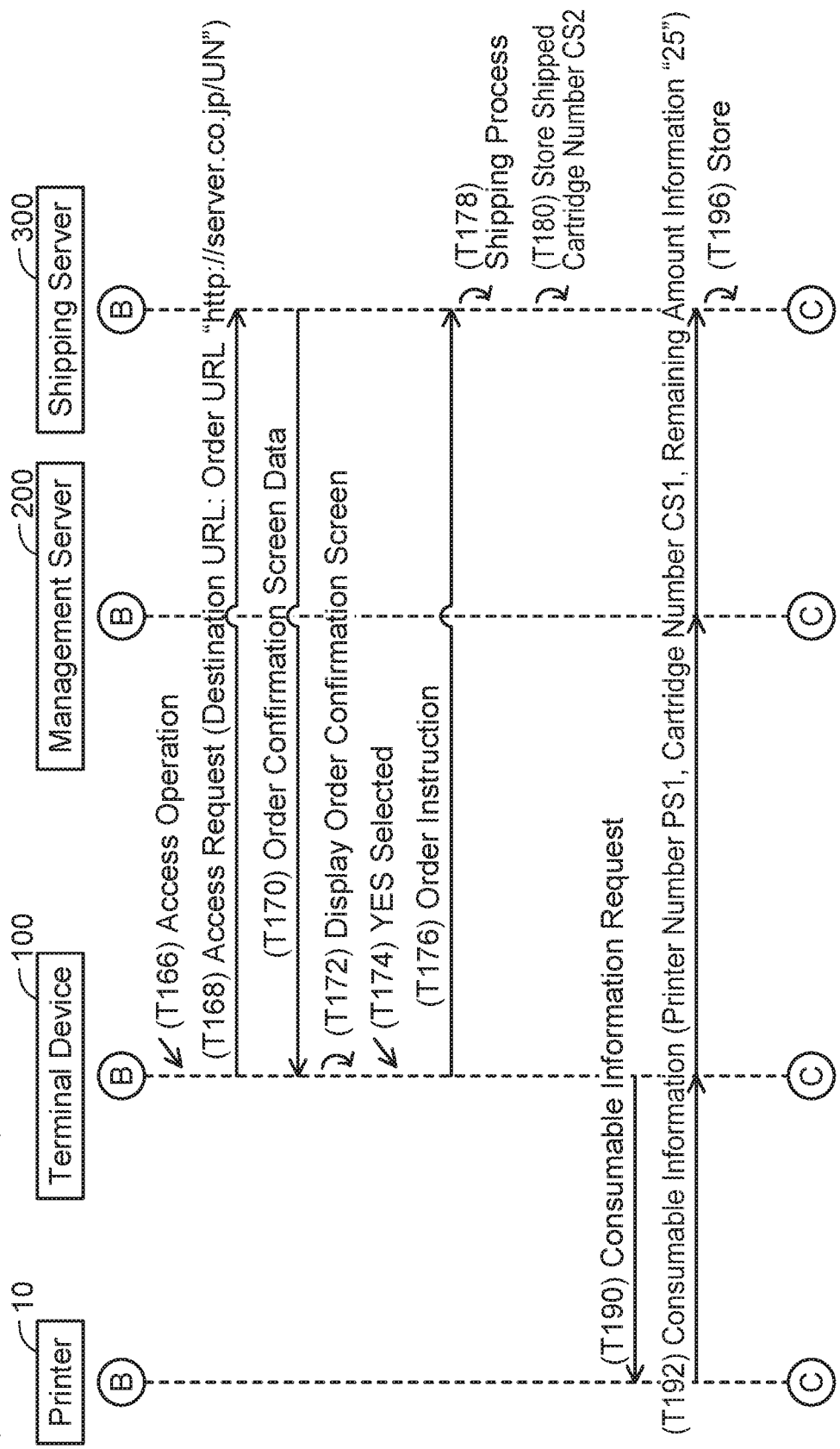
FIG. 8 shows continuation of FIG. 7.
Figure 9:
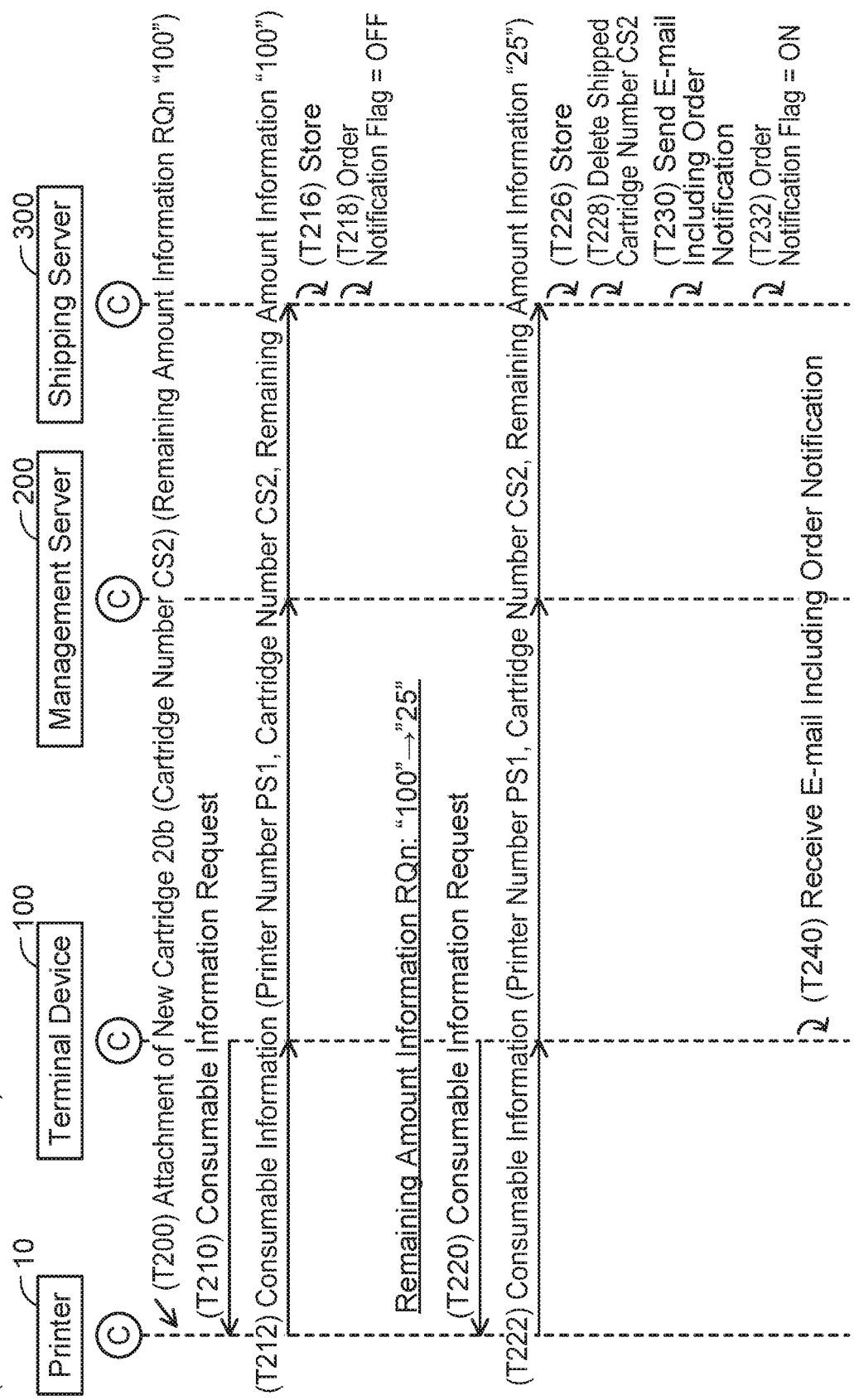
FIG. 9 shows continuation of FIG. 8.

(Case A; FIGS. 7 to 9)

Case A will be described with reference to FIGS. 7 to 9. In Case A, after a new cartridge 20b has been shipped to the user of the printer 10, the cartridge 20b is attached to the printer 10. An initial state of Case A is a state after the registration process of FIGS. 3 and 4 has been completed. As such, "40" has been stored as the remaining amount information RQn in the memory 34 of the printer 10. Further, the cartridge information CH corresponding to the user name UN (printer number PS1, cartridge number CS1, model number "BK01", remaining amount information "40", threshold information "20", order notification flag "OFF", error notification flag "OFF", and shipped cartridge number "empty") has been stored in the cartridge table 340 of the shipping server 300 (see FIG. 2).

When determining that the predetermined time has elapsed since the consumable article information request was sent to the printer 10, the terminal device 100 sends the consumable article information request to the printer 10 in T110. T112 is similar to T64 in FIG. 4.

When receiving the consumable article information from the management server 200 in T112 (YES in S10 of FIG. 5), the shipping server 300 identifies the printer number PS1 in this consumable article information (S20) and identifies the cartridge information CH including the printer number PS1 in the cartridge table 340 (S22). Then, the shipping server 300 determines that the consumable article information received in T112 includes the cartridge number CS1 (YES in S24), determines that the cartridge number CS1 in the consumable article information received in T112 matches the cartridge number CS1 in the cartridge information CH (YES in S110 of FIG. 6), and stores the remaining amount information "40" in the consumable article information received in T112 as the remaining amount information of the cartridge information CH in T116 (S112). Next, the shipping server 300 determines that the remaining amount "40" indicated by the remaining amount information in the consumable article information received in T112 is greater than the threshold "30" indicated by the threshold information in the cartridge information CH (NO in S120).

The present case assumes a situation in which printing is executed in the printer 10 before the predetermined time elapses from the time when the terminal device 100 sent the consumable article information request to the printer 10 in T110. When printing is executed using the cartridge 20a in T130, the printer 10 calculates a used amount "15" of the ink in the cartridge 20a and subtracts the calculated used amount "15" from the remaining amount "40" indicated by the remaining amount information RQn to update the remaining amount indicated by the remaining amount information RQn to "25".

After this, when determining that the predetermined time has elapsed since the consumable article information request was sent to the printer 10 in T110, the terminal device 100 sends the consumable article information request to the printer 10 in T140. T140 and T142 are similar to T110 and T112 respectively, except that the remaining amount information in the consumable article information is different. In this case, the shipping server 300 identifies the printer number PS1 in the consumable article information received in T142 (S20), identifies the cartridge information CH including the printer number PS1 (S22), determines that the received consumable article information includes the cartridge number CS1 (YES in S24), and determines that the cartridge number CS1 in the received consumable article information matches the cartridge number CS1 in the cartridge information CH (YES in S110 of FIG. 6). Then, the shipping server 300 stores in T146 the remaining amount information "25" in the received consumable article information as the remaining amount information of the cartridge information CH (S112), determines that the remaining amount "25" indicated by the remaining amount information in the received consumable article information is equal to or less than the threshold "30" indicated by the threshold information in the cartridge information CH (YES in S120), determines that the order notification flag in the cartridge information CH is "OFF" (YES in S122), and determines that the shipped cartridge number in the cartridge information CH is empty (NO in S124). In this case, the shipping server 300 identifies the user name UN in the cartridge information CH and identifies the e-mail address "aaa@bbb.co.jp" associated with the user name UN in the user table 338. Next, the shipping server 300 sends an e-mail including the order notification to the e-mail address "aaa@bbb.co.jp" in T150 (S126) and changes the order notification flag in the cartridge information CH from "OFF" to "ON" in T152 (S128).

In T160, the terminal device 100 receives the e-mail from the shipping server 300. When accepting an operation for displaying the e-mail received from the shipping server 300 from the user in T162, the terminal device 100 displays a received e-mail screen based on the order notification (order notification screen) on the display unit 114 in T164. This screen includes a message for prompting an order of a new cartridge and an order URL "http://server.co.jp/UN" to be accessed to order a new cartridge. Then, when accepting an operation for accessing the order URL "http://server.co.jp/UN" from the user in T166 of FIG. 8, the terminal device 100 sends to the shipping server 300 in T168 an access request including the order URL "http://server.co.jp/UN" as a destination URL.

When receiving the access request from the terminal device 100 in T168 (YES in S50 of FIG. 5), the shipping server 300 identifies a character string "UN" included in the destination URL in the access request (S52) and identifies the cartridge information CH including the character string "UN" in the cartridge table 340. Then, the shipping server 300 sends order confirmation screen data to the terminal device 100 in T170 (S54).

When receiving the order confirmation screen data from the shipping server 300 in T170, the terminal device 100 displays an order confirmation screen on the display unit 114 in T172. When accepting selection of "YES" in the order confirmation screen from the user in T174, the terminal device 100 sends an order instruction to the shipping server 300 in T176.

When receiving the order instruction from the terminal device 100 in T176 (YES in S56), the shipping server 300 determines that the shipping process should be executed and executes the shipping process in T178 (S58). In the shipping process, the shipping server 300 firstly identifies the user information UI1 including the character string "UN" in the user table 338. Then, the shipping server 300 identifies the address information AD in the user information UI1 and ships the new cartridge 20b to the address identified by the address information AD. As a result, the cartridge 20b is delivered to the user of the printer 10. Then, in T180, the shipping server 300 stores a cartridge number CS2 assigned to the shipped cartridge 20b as the shipped cartridge number of the cartridge information CH (S60).

After this, when determining that the predetermined time has elapsed since the consumable article information request was sent to the printer 10 in T140, the terminal device 100 sends the consumable article information request to the printer 10 in T190. T190 and T192 are respectively similar to T140 and T142 of FIG. 7. In this case, the shipping server 300 identifies the printer number PS1 in the consumable article information received in T192 (S20), identifies the cartridge information CH including the printer number PS1 (S22), determines that the received consumable article information includes the cartridge number CS1 (YES in S24 of FIG. 5), and determines that the cartridge number CS1 in the received consumable article information matches the cartridge number CS1 in the cartridge information CH (YES in S110 of FIG. 6). Then, in T196, the shipping server 300 stores the remaining amount information "25" in the received consumable article information as the remaining amount information of the cartridge information CH (S112), determines that the remaining amount "25" indicated by the remaining amount information in the received consumable article information is equal to or less than the threshold "30" indicated by the threshold information in the cartridge information CH (YES in S120), and determines that the order notification flag in the cartridge information CH is "ON" (NO in S122).

After this, in T200 of FIG. 9, the cartridge 20a attached to the printer 10 is replaced with the cartridge 20b by the user of the printer 10. When the cartridge 20b is attached to the printer 10, the printer 10 updates the remaining amount information RQn in the memory 34 to "100".

After this, when determining that the predetermined time has elapsed since the consumable article information request was sent to the printer 10 in T190 (see FIG. 8), the terminal device 100 sends the consumable article information request to the printer 10 in T210. T210 and T212 are similar to T140 and T142 in FIG. 8 respectively, except that the cartridge number and the remaining amount information in the consumable article information are different. In this case, the shipping server 300 identifies the printer number PS1 in the consumable article information received in T212 (S20), identifies the cartridge information CH including the printer number PS1 (S22), determines that the received consumable article information includes the cartridge number CS2 (YES in S24 of FIG. 5), and determines that the cartridge number CS2 in the received consumable article information does not match the cartridge number CS1 in the cartridge information CH (NO in S110 of FIG. 6). Then, in T216, the shipping server 300 stores the remaining amount information "100" and the cartridge number CS2 in the received consumable article information as the remaining amount information and the cartridge number of the cartridge information CH (S114), and changes the order notification flag in the cartridge information CH from "ON" to "OFF" in T218 (S116). Next, the shipping server 300 determines that the remaining amount "100" indicated by the remaining amount information in the received consumable article information is greater than the threshold "30" indicated by the threshold information in the cartridge information CH (NO in S120).

The present case assumes a situation in which printing using the printer 10 is executed after the cartridge attached to the printer 10 has been replaced with the cartridge 20b and the remaining amount indicated by the remaining amount information RQn is updated from "100" to "25".

In T220, the terminal device 100 sends the consumable article information request to the printer 10. T220 and T222 are similar to T210 and T212 respectively, except that the remaining amount information in the consumable article information is different. In this case, the shipping server 300 identifies the printer number PS1 in the consumable article information received in T222 (S20), identifies the cartridge information CH including the printer number PS1 (S22), determines that the received consumable article information includes the cartridge number CS2 (YES in S24), determines that the cartridge number CS2 in the received consumable article information matches the cartridge number CS2 in the cartridge information CH (YES in S110 of FIG. 6), and then stores the remaining amount information "25" in the received consumable article information as the remaining amount information of the cartridge information CH in T226 (S112). Next, the shipping server 300 determines that the remaining amount "25" indicated by the remaining amount information in the received consumable article information is equal to or less than the threshold "30" indicated by the threshold information in the cartridge information CH (YES in S120), determines that the order notification flag in the cartridge information CH is "OFF" (YES in S122), determines that the cartridge number CS2 is stored as the shipped cartridge number in the cartridge information CH (YES in S124), and determines that the cartridge number CS2 in the received consumable article information matches the shipped cartridge number CS2 in the cartridge information CH (YES in S130). Next, in T228, the shipping server 300 deletes the shipped cartridge number CS2 in the cartridge information CH (S132). T230 to T240 are similar to T150 to T160 of FIG. 7.

Figure 10:
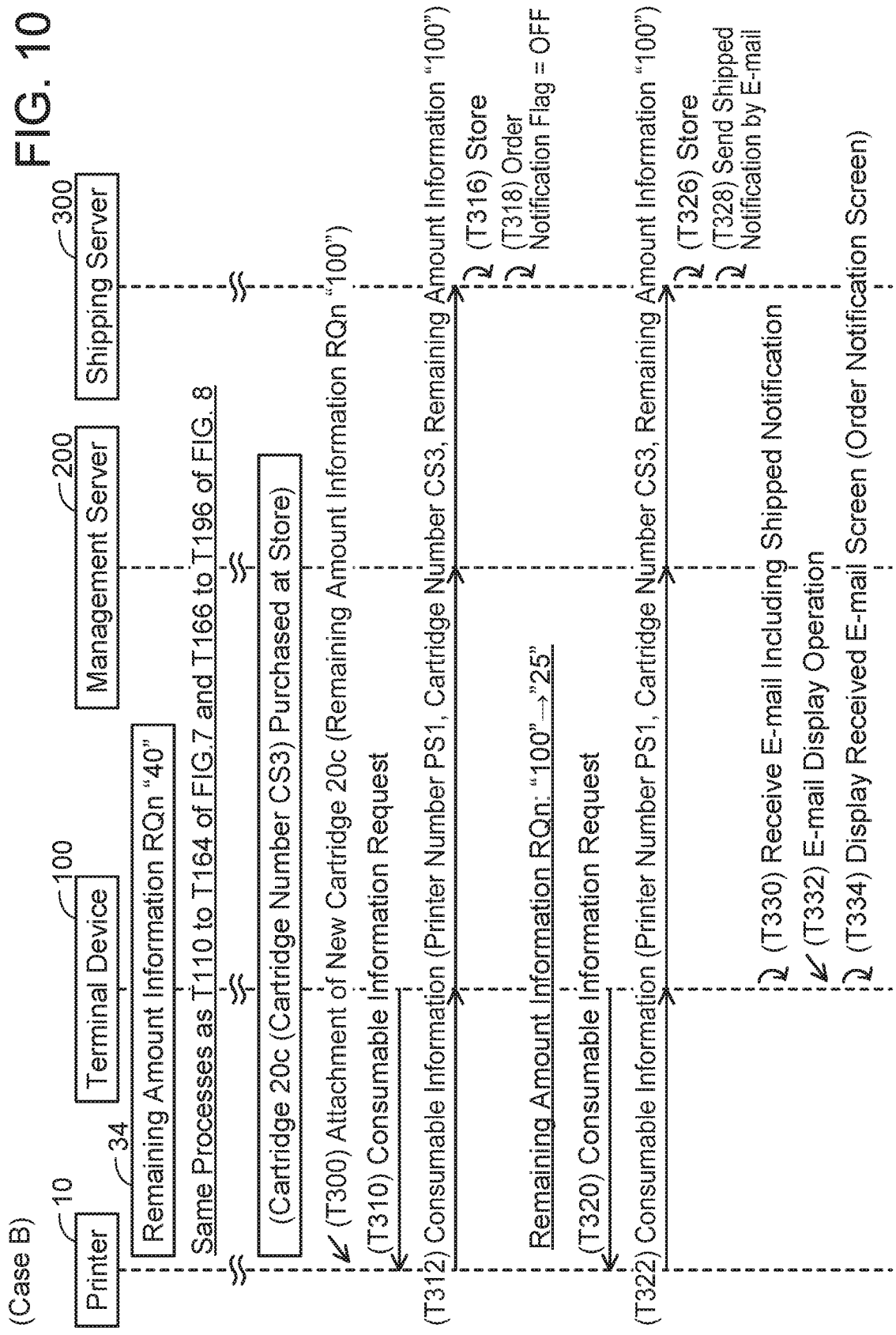
FIG. 10 shows a sequence diagram of Case B in which a cartridge purchased in a store is attached to the printer.

(Case B; FIG. 10)

Next, Case B will be described with reference to FIG. 10. In Case B, the user of the printer 10 purchases a cartridge 20c in a store after having ordered a new cartridge by accessing the shipping server 300 and the cartridge 20c, which is different from the shipped cartridge 20b, is attached to the printer 10. An initial state of Case B is similar to the initial state of Case A. A cartridge number CS3 is assigned to the cartridge 20c.

Firstly, processes similar to T110 to T164 of FIG. 7 and T166 to T196 of FIG. 8 are executed between the printer 10, the terminal device 100, the management server 200, and the shipping server 300. As mentioned, in the present case, the user of the printer 10 purchases the cartridge 20c in the store, and the cartridge 20a attached to the printer 10 is replaced with the cartridge 20c by the user of the printer 10 in T300. When the cartridge 20c is attached, the printer 10 updates the remaining amount information RQn in the memory 34 to "100".

After this, when determining that the predetermined time has elapsed since the consumable article information request was sent to the printer 10 in T190 (see FIG. 8), the terminal device 100 sends the consumable article information request to the printer 10 in T310. T310 and T312 are similar to T210 and T212 of FIG. 9 respectively, except that the cartridge number in the consumable article information is different. In this case, the shipping server 300 identifies the printer number PS1 in the consumable article information received in T312 (S20), identifies the cartridge information CH including the printer number PS1 (S22), determines that the received consumable article information includes the cartridge number CS3 (YES in S24), and determines that the cartridge number CS3 in the received consumable article information is different from the cartridge number CS1 in the cartridge information CH (NO in S110 of FIG. 6). Then in T316, the shipping server 300 stores the remaining amount information "100" and the cartridge number CS3 in the received consumable article information as the remaining amount information and the cartridge number of the cartridge information CH (S114). T318 is similar to T218. Next, the shipping server 300 determines that the remaining amount "100" indicated by the remaining amount information in the received consumable article information is greater than the threshold "30" indicated by the threshold information in the cartridge information CH (NO in S120).

The present case assumes a situation in which printing using the printer 10 is executed after the cartridge attached to the printer 10 has been replaced with the cartridge 20c and the remaining amount indicated by the remaining amount information RQn is updated from "100" to "25".

In T320, the terminal device 100 sends the consumable article information request to the printer 10. T320 and T322 are similar to T310 and T312 respectively, except that the remaining amount information in the consumable article information is different. In this case, the shipping server 300 identifies the printer number PS1 in the consumable article information received in T322 (S20), identifies the cartridge information CH including the printer number PS1 (S22), determines that the received consumable article information includes the cartridge number CS3 (YES in S24), determines that the cartridge number CS3 in the received consumable article information matches the cartridge number CS3 in the cartridge information CH (YES in S110 of FIG. 6), and then stores the remaining amount information "25" in the received consumable article information as the remaining amount information of the cartridge information CH in T326 (S112). Next, the shipping server 300 determines that the remaining amount "25" indicated by the remaining amount information in the received consumable article information is equal to or less than the threshold "30" indicated by the threshold information in the cartridge information CH (YES in S120), determines that the order notification flag in the cartridge information CH is "OFF" (YES in S122), determines that the cartridge number CS2 is stored as the shipped cartridge number in the cartridge information CH (YES in S124), and determines that the cartridge number CS3 in the received consumable article information does not match the shipped cartridge number CS2 in the cartridge information CH (NO in S130). In this case, the shipping server 300 identifies the user name UN in the cartridge information CH and identifies the e-mail address "aaa@bbb.co.jp" associated with the user name UN in the user table 338. Next, the shipping server 300 sends an e-mail including the shipped notification to the e-mail address "aaa@bbb.co.jp" in T328 (S140).

In T330, the terminal device 100 receives the e-mail from the shipping server 300. When accepting an operation for displaying the e-mail received from the shipping server 300 from the user in T332, the terminal device 100 displays a received e-mail screen based on the shipped notification (shipped notification screen) on the display unit 114 in T334. Although omitted from the drawing, this screen includes a message that notifies the user that the new cartridge has been shipped and this cartridge has not been used yet. Thus, the user can acknowledge that he/she is possessing the unused cartridge 20b. Therefore, an order of another new cartridge can be avoided when the user already possesses the cartridge 20b. Thus, possession of excess cartridge by the user can further be suppressed.

Effects of Present Embodiment

The user of the printer 10 may purchase the cartridge 20*c* from a store after having ordered the new cartridge 20*b* by accessing the order URL described in the order notification screen (see FIG. 7). In such a case, if the user replaces the cartridge 20*a* attached to the printer 10 with the cartridge 20*c*, the user comes to possess the excess cartridge 20*b*. If an email including the order notification is sent to the terminal device 100 due to the cartridge 20*c* being consumed in such a situation, another cartridge may be ordered. In this case, another excess cartridge would be delivered to the user, although the user already possesses the cartridge 20*b*. In view of this, in the present embodiment, the shipping server 300 executes the shipping process for shipping the cartridge 20*b* to which the cartridge number CS2 is assigned (S58 of FIG. 5, T178 of FIG. 8) in response to accepting the order instruction from the user (YES in S56 of FIG. 5, T176 of FIG. 8) and stores the cartridge number CS2 as the shipped cartridge number in the cartridge table 340 in the memory 334 (S60 of FIG. 5, T180 of FIG. 8). When receiving the consumable article information including the remaining amount information from the terminal device 100 with the shipped cartridge number CS2 being stored in the cartridge table 340 (YES in S10 of FIG. 5), the shipping server 300 uses the remaining amount information included in the consumable article information to determine whether the condition for sending the order notification is satisfied or not (S120). Further, in the case of receiving the consumable article information from the terminal device 100 (YES in S10) and determining that the consumable article information includes a cartridge number (YES in S24), the shipping server 300 determines whether the shipped cartridge number CS2 in the cartridge table 340 matches the cartridge number included in the consumable article information (S130). Then, in the case of determining that the condition for sending the order notification is satisfied (YES in S120) and the shipped cartridge number CS2 in the cartridge table 340 matches the cartridge number CS2 included in the consumable article information (YES in S130 of FIG. 6, Case A in FIGS. 7 to 9), the shipping server 300 sends the order notification for prompting the user to order a new cartridge to the terminal device 100 (S126 of FIG. 6, T240 of FIG. 9). On the other hand, the order notification is not sent in the case where the shipping server 300 determines that the notification condition is not satisfied (NO in S120 of FIG. 6) or determines that the shipped cartridge number in the cartridge table 340 does not match the cartridge number included in the consumable article information (NO in S130, Case B of FIG. 10). The case in which the shipped cartridge number CS2 in the cartridge table 340 does not match the cartridge number included in the consumable article information is a case in which the cartridge 20*c*, which is different from the cartridge 20*b*, is attached to the printer 10, that is, a case in which the user possesses the cartridge 20*b* as an excess cartridge. Thus, sending of the order notification to the terminal device 100 can be suppressed when the user possesses the cartridge 20*b* as an excess cartridge. As a result, shipping of another excess cartridge to the user can be suppressed, thus possession of excess cartridge by the user can be suppressed.

(Corresponding Relationships)

The management server 200 and the shipping server 300 are examples of "server". The terminal device 100 is an example of "external device". The cartridge 20*b* and the cartridge number CS2 are respectively examples of "first consumable article" and "first identification information". The remaining amount information is an example of "usage information". The cartridges 20*a*, 20*b*, and 20*c* are examples of "second consumable article". The cartridge numbers CS1, CS2, and CS3 are examples of "second identification information". The order notification, the error notification, and the shipped notification are respectively examples of "first notification", "second notification", and "third notification". The consumable article information including a cartridge number is an example of "consumable article information includes predetermined information related to a vendor of the printer".

S58 and S60 of FIG. 5 are respectively examples of "execute a first shipping process" and "store the first identification information". S10 of FIG. 5 is an example of "receive consumable article information". S120, S130, and S126 of FIG. 6 are respectively examples of "determine whether a notification condition is satisfied", "determine whether the first identification information matches the second identification information", and "send a first notification".

(First Variant) The "server" may be a server in which the management server 200 and the shipping server 300 are configured integrally.

(Second Variant) The order notification, the error notification, and the shipped notification may not be sent by e-mail. For example, the shipping server 300 may send the respective notifications to the terminal device 100 by using communication in which the service application 138 installed in the terminal device 100 is designated as the destination. In this variant, the communication system 2 includes a service server in which the management server 200 and the shipping server 300 are integrally configured. Further, the terminal device 100 (more specifically, the service application 138) sends the consumable article information request as an HTTP request to the service server by using communication according to Hypertext Transfer Protocol (HTTP). The service server monitors whether the consumable article information is received from the terminal device 100 in S10 of FIG. 5, and determines YES in S10 and proceeds to S20 in a case of receiving the consumable article information from the terminal device 100. Then, the service server can send the order notification, the error notification, and the shipped notification to the terminal device 100 (more specifically, the service application 138) by sending the order notification (S126 of FIG. 6), the error notification (S42 of FIG. 5), and the shipped notification (S140 of FIG. 6) as HTTP responses to the HTTP request received in S10. Further, the respective notifications may be sent by different methods.

(Third Variant) The printer 10 may be an example of the "external device". In this variant, the communication I/F 16 of the printer 10 is connected to the Internet 8.

(Fourth Variant) The "consumable article" is not limited to the cartridge, but may be print paper. In this variant, the shipping server 300 receives consumable article information that includes information indicating the number of print paper used in printing from the terminal device 100. In this variant, the information indicating the number of print paper used in printing is an example of the "usage information".

(Fifth Variant) S24 and S40 to S46 of FIG. 5 may be omitted. In this variant, "determine whether the consumable article information includes predetermined information related to a vendor of the printer" and "send a second notification" can be omitted.

(Sixth Variant) A cartridge number of cartridge that is the target of the shipping service may be stored in the memory 334 of the shipping server 300 in advance. In this variant, the CPU 332 determines in S24 of FIG. 5 whether the cartridge number in the consumable article information matches the cartridge number of the cartridge that is the target of the shipping service stored in the memory 334. In this variant, the CPU 332 determines YES in S24 in a case where the cartridge number in the consumable article information matches the cartridge number of the target of the shipping service. On the other hand, the CPU 332 determines NO in S24 in a case where the consumable article information does not include cartridge information or in a case where the cartridge number in the consumable article information does not match the cartridge number of the target of the shipping service.

(Seventh Variant) S140 of FIG. 6 may be omitted. In this variant, "send a second notification" may be omitted.

(Eighth Variant) The order notification may not include the order URL. In this variant, the shipping server 300 may monitor whether the user logs into the shipping server 300 or not instead of S50 to S56 of FIG. 5. Then, the CPU 332 executes the shipping process (S58) in a case where the user logs into the shipping server 300. In this variant, "determine whether the URL has been accessed", "send selection screen data", and "receive a second order instruction" may be omitted.

(Ninth Variant) S54 and S56 of FIG. 5 may be omitted. In this variant, the CPU 332 executes the shipping process (S58) in response to the order URL being accessed. In this variant, "determine whether the URL has been accessed" and "receive a second order instruction" may be omitted.

(Tenth Variant) In the embodiment above, the processes of FIGS. 3 to 10 are realized by software (e.g., the programs 36, 136, 236, 336), however, at least one of these processes may be realized by hardware such as a logic circuit.

What is claimed is:

1. A server comprising:
a controller configured to:
execute a first shipping process for shipping a first consumable article for a printer in response to accepting a first order instruction from a user, the first consumable article being identified by first identification information;
in a case where the first shipping process is executed, store the first identification information in a memory;
receive consumable article information including usage information from an external device in a state where the first identification information is stored in the memory, the usage information being information related to a current used amount of a second consumable article that is currently attached to the printer;
in a case where the consumable article information is received from the external device, determine by using the usage information included in the consumable article information whether a notification condition is satisfied, the notification condition being related to an order of a new consumable article;
in a case where the consumable article information is received from the external device and the consumable article information includes second identification information for identifying the second consumable article, determine whether the first identification information in the memory matches the second identification information included in the consumable article information; and
in a case where it is determined that the notification condition is satisfied and the first identification information matches the second identification information, send a first notification for prompting the user to order a new consumable article to a first external, wherein in a case where it is determined that the notification condition is not satisfied, the first notification is not sent, and in a case where it is determined that the first identification information does not match the second identification information, the first notification is not sent,
wherein the first notification includes a Uniform Resource Locator (URL) to be accessed for ordering the new consumable article, and
the controller is further configured to:
determine whether the URL has been accessed after the first notification has been sent to the first external; and
in a case where it is determined that the URL has been accessed, execute a second shipping process for shipping the new consumable article, wherein in a case where it is determined that the URL has not been accessed, the second shipping process is not executed; and
wherein the controller is further configured to:
in the case where it is determined that the URL has been accessed, send selection screen data to the external device for displaying a selection screen on the external device, the selection screen being for the user to select whether the second shipping process is to be executed by the server; and
in a case where the user selects on the selection screen that the second shipping process is to be executed by the server, receive a second order instruction from the external device,
wherein in a case where it is determined that the URL has been accessed and the second order instruction is received from the external device, the second shipping process is executed, and
in a case where it is determined that the URL has been accessed and the second order instruction is not received from the external device, the second shipping process is not executed.

2. The server as in claim 1, wherein
the first notification is sent to the first external by e-mail.

3. The server as in claim 1, wherein
the external device is a terminal device, and
in a case where the consumable article information is sent to the external device from the printer, the consumable article information is received from the external device.

4. The server as in claim 1, wherein
the usage information indicates a remaining amount of a coloring material which is the consumable article,
in a case where the remaining amount indicated by the usage information is equal to or less than a threshold, it is determined that the notification condition is satisfied, and
in a case where the remaining amount indicated by the usage information is greater than the threshold, it is determined that the notification condition is not satisfied.

5. The server as in claim 1, wherein
the controller is further configured to:
in the case where the consumable article information is received from the external device, determine whether the consumable article information includes predetermined information related to a vendor of the printer; and
in a case where it is determined that the consumable article information does not include the predetermined information, send a second notification to a second external, the second notification indicating that a service related to the order of the new consumable article cannot be received.

6. The server as in claim 1, wherein
the controller is further configured to:
in a case where it is determined that the notification condition is satisfied and the first identification information does not match the second identification information, send a third notification to a third external, the third notification indicating that the first consumable article has not been used yet.

7. A non-transitory computer-readable recording medium storing computer-readable instructions for a server, wherein
the computer-readable instructions, when executed by a processor of the server, cause the server to:
execute a first shipping process for shipping a first consumable article for a printer in response to accepting a first order instruction from a user, the first consumable article being identified by first identification information;
in a case where the first shipping process is executed, store the first identification information in a memory of the server;
receive consumable article information including usage information from an external device in a state where the first identification information is stored in the memory, the usage information being current information related to a current used amount of a second consumable article that is currently attached the printer;
in a case where the consumable article information is received from the external device, determine by using the usage information included in the consumable article information whether a notification condition is satisfied, the notification condition being related to an order of a new consumable article;
in a case where the consumable article information is received from the external device and the consumable article information includes second identification information for identifying the second consumable article, determine whether the first identification information in the memory matches the second identification information included in the consumable article information; and
in a case where it is determined that the notification condition is satisfied and the first identification information matches the second identification information, send a first notification for prompting the user to order a new consumable article to a first external, wherein in a case where it is determined that the notification condition is not satisfied, the first notification is not sent, and wherein in a case where it is determined that the first identification information does not match the second identification information, the first notification is not sent,
wherein the first notification includes a Uniform Resource Locator (URL) to be accessed for ordering the new consumable article, and
the computer-readable instructions, when executed by the processor, further cause the server to:
determine whether the URL has been accessed after the first notification has been sent to the first external; and
in a case where it is determined that the URL has been accessed, execute a second shipping process for shipping the new consumable article, wherein in a case where it is determined that the URL has not been accessed, the second shipping process is not executed; and
wherein the computer-readable instructions, when executed by the processor, further cause the server to:
in the case where it is determined that the URL has been accessed, send selection screen data to the external device for displaying a selection screen on the external device, the selection screen being for the user to select whether the second shipping process is to be executed by the server; and
in a case where the user selects on the selection screen that the second shipping process is to be executed by the server, receive a second order instruction from the external device,
wherein in a case where it is determined that the URL has been accessed and the second order instruction is received from the external device, the second shipping process is executed, and
in a case where it is determined that the URL has been accessed and the second order instruction is not received from the external device, the second shipping process is not executed.

8. The non-transitory computer-readable recording medium as in claim 7,
the first notification is sent to the first external by e-mail.

9. The non-transitory computer-readable recording medium as in claim 7, wherein
the external device is a terminal device, and
in a case where the consumable article information is sent to the external device from the printer, the consumable article information is received from the external device.

10. The non-transitory computer-readable recording medium as in claim 7, wherein
the usage information indicates a remaining amount of a coloring material which is the consumable article,
in a case where the remaining amount indicated by the usage information is equal to or less than a threshold, it is determined that the notification condition is satisfied, and
in a case where the remaining amount indicated by the usage information is greater than the threshold, it is determined that the notification condition is not satisfied.

11. The non-transitory computer-readable recording medium as in claim 7, wherein
the computer-readable instructions, when executed by the processor, further cause the server to:
in the case where the consumable article information is received from the external device, determine whether the consumable article information includes predetermined information related to a vendor of the printer; and
in a case where it is determined that the consumable article information does not include the predetermined information, send a second notification to the second external, the second notification indicating that a service related to the order of the new consumable article cannot be received.

12. The non-transitory computer-readable recording medium as in claim 7, wherein
the computer-readable instructions, when executed by the processor, further cause the server to:
in a case where it is determined that the notification condition is satisfied and the first identification information does not match the second identification information, send a third notification to the third external, the third notification indicating that the first consumable article has not been used yet.

13. A method executed by a server, the method comprising:

executing a first shipping process for shipping a first consumable article for a printer in response to accepting a first order instruction from a user, the first consumable article being identified by first identification information;

in a case where the first shipping process is executed, storing the first identification information in a memory;

receiving consumable article information including usage information from an external device in a state where the first identification information is stored in the memory, the usage information being information related to a current used amount of a second consumable article that is currently attached to the printer;

in a case where the consumable article information is received from the external device, determining by using the usage information included in the consumable article information whether a notification condition is satisfied, the notification condition being related to an order of a new consumable article;

in a case where the consumable article information is received from the external device and the consumable article information includes second identification information for identifying the second consumable article, determining whether the first identification information in the memory matches the second identification information included in the consumable article information; and in a case where it is determined that the notification condition is satisfied and the first identification information matches the second identification information, sending a first notification for prompting the user to order a new consumable article to a first external, wherein in a case where it is determined that the notification condition is not satisfied, the first notification is not sent, and in a case where it is determined that the first identification information does not match the second identification information, the first notification is not sent, wherein the first notification includes a Uniform Resource Locator (URL) to be accessed for ordering the new consumable article, and the controller is further configured to:
determine whether the URL has been accessed after the first notification has been sent to the first external; and in a case where it is determined that the URL has been accessed, execute a second shipping process for shipping the new consumable article, wherein in a case where it is determined that the URL has not been accessed, the second shipping process is not executed; and wherein the controller is further configured to:
in the case where it is determined that the URL has been accessed, send selection screen data to the external device for displaying a selection screen on the external device, the selection screen being for the user to select whether the second shipping process is to be executed by the server; and in a case where the user selects on the selection screen that the second shipping process is to be executed by the server, receive a second order instruction from the external device, wherein in a case where it is determined that the URL has been accessed and the second order instruction is received from the external device, the second shipping process is executed, and in a case where it is determined that the URL has been accessed and the second order instruction is not received from the external device, the second shipping process is not executed.

14. The method as in claim 13, wherein
the first notification is sent to the first external by e-mail.

15. The method as in claim 13, wherein
the external device is a terminal device, and
in a case where the consumable article information is sent to the external device from the printer, the consumable article information is received from the external device.

16. The method as in claim 13, wherein
the usage information indicates a remaining amount of a coloring material which is the consumable article,
in a case where the remaining amount indicated by the usage information is equal to or less than a threshold, it is determined that the notification condition is satisfied, and
in a case where the remaining amount indicated by the usage information is greater than the threshold, it is determined that the notification condition is not satisfied.

* * * * *